United States Patent Office 3,155,606
Patented Nov. 3, 1964

3,155,606
PROCESS FOR SWEETENING SOUR HYDROCARBONS AND REGENERATING USED CATALYST
Richard H. Coe, Long Beach, Calif., assignor to Shell Oil Company, New York, N.Y., a corporation of Delaware
No Drawing. Filed Dec. 28, 1962, Ser. No. 247,817
7 Claims. (Cl. 208—203)

This process relates to a sweetening process for converting mercaptans, contained in hydrocarbon, to disulfides.

It is known that mercaptans can be extracted from hydrocarbon fractions by passing the fraction, in the absence of air, through a bed of charcoal previously soaked in caustic alkali solution. The mercaptans are absorbed on the bed. The bed is frequently renewed or regenerated by blowing with superheated, dry steam or air, or the bed is removed and reactivated in a furnace at temperatures in the range of 500 to 1000° C. using mixtures of steam, inert gas and air. Superheated steam or air is necessarily used to vaporize the mercaptans which are removed from the bed as vapors. It has been proposed to regenerate the bed in place by dissolving oxygen in the hydrocarbon and passing it through the bed during the sweetening process. The mercaptans absorbed on the bed are converted to disulfides which are soluble in hydrocarbon. However, when processing gasoline containing impurities such as alkyl phenols and naphthenic acids, the in-place regeneration of the bed is not complete and so the efficiency of the sweetening process continually declines. Moreover, the regeneration techniques of heating in a furnace and/or using superheated steam or air are not effective in restoring the bed to its original activity.

It has now been discovered that a mercaptan-containing gasoline having from about 2 to about 20 p.p.m. alkyl phenol can be effectively sweetened by passing the gasoline in the presence of an oxygen-containing gas through a carbon bed which has been previously soaked with an aqueous caustic solution of from about 10% to about 20% by weight sodium hydroxide, and thereafter periodically regenerating the bed by washing the bed at elevated temperatures. Conversion of mercaptan to disulfide of more than 90% is realized using this process.

The process is generally applicable to the sweetening of mercaptan-containing hydrocarbons having from about 2 to about 20 p.p.m. alkyl phenols such as those boiling within the gasoline boiling range, particularly non-olefinic, e.g., straight-run, gasolines having a boiling range of from about 70° F. to about 450° F.

It is believed that the oxidation of mercaptans occurs principally at the interface between the caustic and hydrocarbon. And the highest sweetening activity occurs when the maximum interfacial area is present. When a bed of activated carbon (such as described in Active Carbon, Hassler Chemical Publishing Co., Inc., Brooklyn, N.Y., 1951) derived either from petroleum or coconuts and having a small particle size, e.g., from about 4 to about 20 mesh, is impregnated by soaking with a caustic solution having a concentration of from about 10% to about 20% by weight sodium hydroxide, the carbon bed is not normally wetted by the caustic. And, instead of a continuous film being formed on the bed, submicroscopic caustic globules are formed on the external (visible) surface of the carbon and furnish an extensive caustic/gasoline interface at which the sweetening reaction occurs. The caustic globules are held to the external surface of the carbon by "roots" of caustic which penetrate the channels and pores of the carbon.

Conditions that lead to the disappearance of the submicroscopic globules are undesirable and those that foster and maintain the globules are desirable. Therefore, in order to maintain the globules and optimum oxidation rate, it is desirable to circulate a small amount, e.g., from about 0.05 to about 0.3% v. basis gasoline, of aqueous caustic solution (having a concentration of from about 10% to about 20% by weight sodium hydroxide) by dispersing the caustic in the gasoline feed. The rate of oxidation towards the inlet end of the reactor is generally maintained because the dispersed drops of caustic in the gasoline keep the carbon surface supplied with globules of caustic. However, the rate of oxidation is generally not maintained as well towards the exit end of the reactor because the caustic dispersion is either relatively coarse or coalescence is complete and the supply of globules cannot be maintained over the entire cross-section of the reactor. Therefore, in order to obtain and maintain a high oxidation rate throughout the entire length of the reactor, it is desirable to operate at high superficial linear velocities (volume hydrocarbon per minute/cross-sectional area of reactor) of from about 3 to 6 feet per minute, preferably from about 5 to about 6 feet per minute, to insure good distribution of caustic in the gasoline and on the carbon. At velocities above about 6 feet per minute, the globules are stripped from the carbon, resulting in a rapid decrease in sweetening.

Conditions that promote wetting of the carbon are also undesirable because the submicroscopic globules disappear and form a continuous, caustic film on the wetted carbon. Thus, the presence of alkyl phenol which reacts with caustic to form sodium phenolates causes serious deactivation of the bed. The phenolates sorb on the bed and serve as very effective wetting agents.

The phenols (and/or their oxidative products) appear to have an accumulative effect and it is necessary to employ a special procedure for the substantially complete removal of phenol and other contaminants from the bed when processing gasoline having from about 2 to about 20 p.p.m. alkyl phenol. The use of dry, superheated steam (which contains no free water), as has been the past practice wherein heat is used to vaporize mercaptans, does not effectively remove the highly-undesirable, non-volatile phenolates from the bed. It is necessary therefore to employ a water wash during the regeneration process which is carried out at elevated temperatures, e.g., above about 200° F. The wash water can be provided by, for example, the use of wet, saturated steam, e.g., steam containing about 0.5% v. or more free water, preferably from about 5% to about 15% v. free water; wet, saturated steam or dry steam and intermittent water washes; or by the use of hot air and intermittent water washes. It is preferred to use either steam condensate or deionized water for the washes. Regeneration is continued until the wash water, generally recovered from the bottom of the reactor, is substantially free of contaminants such as phenolates or naphthenates. The washed bed is then resoaked with caustic by, for example, filling the reactor with caustic, allowing the bed to remain covered with caustic, for example, for about 12 hours, and then draining the excess caustic from the bed. The bed can be air dried, before caustic soaking, to reduce the soaking period.

The following example is illustrative of some of the advantages derived from the invention, but is not to be considered to limit the scope of the invention.

EXAMPLE I

A bed of fresh, activated carbon, derived from petroleum and containing pelleted carbon having a particle size of from about 6 to about 8 mesh, was presoaked with 22 Bé. sodium hydroxide (an aqueous caustic solution having a concentration of about 16% w. sodium hydroxide). Soaking was accomplished by filling a reactor (about 33 feet in length by about 4 inches in diameter) containing the bed of carbon with caustic, allowing the bed to remain covered with caustic for about 15 minutes and then draining the excess caustic from the bed. Of course, it is possible to allow the bed of fresh carbon to remain covered with caustic for longer periods, for example, up to two days. However, the bed can be activated in the shorter periods. It is estimated that about 0.4 cc. of caustic is absorbed per g. of fresh, activated carbon.

A straight-run gasoline, having a boiling range of from about 130° F. to about 300° F. and containing about 3 p.p.m. alkyl phenol and about 110 p.p.m. mercaptan sulfur, was mixed with about 0.1% v. basis feed of 16% w. aqueous sodium hydroxide. In addition, about 0.8 s.c.f. of air/bbl. gasoline was dissolved in the gasoline. It is desirable to have in the gasoline at least the stoichiometric amount of oxygen necessary to convert the mercaptans to disulfides; generally from about 2 to about 4 times the stoichiometric amount is used. The gasoline, now containing caustic, and dissolved oxygen, was passed through the bed at superficial linear velocities of 1.6, 3.0 and 5.4 feet per minute, and at ambient temperatures. (The sweetening can be carried out at a temperature in the range of from about 50° F. to about 150° F.) A comparison of the results of these tests is shown in Table I.

*Table I*

| Superficial linear velocity, feet/min.: | Mercaptan conversion, percent w. |
|---|---|
| 1.6 | 82 |
| 3.0 | 90 |
| 5.4 | 97 |

In order to obtain a sweetened product with more than 90% mercaptan conversion, it is necessary to operate at superficial velocities above about 3.0 feet per minute.

When the bed becomes badly deactivated, e.g., after about 2 to about 4 months' operation depending upon variables such as phenol content of the gasoline, etc., it is necessary to regenerate the bed by washing at elevated temperatures. Alkyl phenols, which were detected in the condensate after several hours of steaming (at from about 220 to about 240° F.) with wet steam containing from about 5 to about 10% v. free water, rapidly disappeared from the condensate after two water flushings of one-minute duration each. The bed was then resoaked with 22 Bé. caustic by filling the reactor with caustic, allowing the bed to remain covered with caustic for about 16 hours (to allow the caustic and any condensate on the bed to reach equilibrium) and then draining the excess caustic from the bed. The use of the above technique resulted in good restoration of bed activity.

I claim as my invention:

1. In a process for the sweetening of mercaptan-containing gasoline having from about 2 to about 20 p.p.m. alkyl phenols which comprises
passing the gasoline
in the presence of an oxygen-containing gas
through a bed of activated carbon, which has been presoaked with an aqueous caustic solution comprising from about 10% to about 20% by weight sodium hydroxide,
until the bed becomes deactivated,
the improvement which comprises thereafter regenerating the bed
at elevated temperatures
by passing water through the bed.

2. In a process for the sweetening of mercaptan-contacting gasoline having from about 2 to about 20 p.p.m. alkyl phenols which comprises
passing the gasoline
in the presence of an oxygen-containing gas
through a bed of activated carbon, which has been presoaked with an aqueous caustic solution comprising from about 10% to about 20% by weight sodium hydroxide,
until the bed becomes deactivated,
the improvement which comprises thereafter regenerating the bed
at elevated temperatures
by passing wet steam containing at least 0.5% by volume free water through the bed.

3. The process according to claim 2 wherein the wet steam contains from about 5 to about 10% v. free water.

4. In a process for the sweetening of mercaptan-containing gasoline having from about 2 to about 20 p.p.m. alkyl phenol which comprises
mixing with the gasoline an aqueous caustic solution comprising from about 10 to about 20% w. sodium hydroxide, the caustic being present in the amount from about 0.05% to about 0.3% v. basis gasoline,
passing the gasoline, now containing caustic,
in the presence of an oxygen-containing gas
through a bed of activated carbon, which has been presoaked with an aqueous caustic solution comprising from about 10% to about 20% by weight sodium hydroxide,
until the bed becomes deactivated,
the improvement which comprises thereafter regenerating the bed
at elevated temperatures
by passing water through the bed.

5. In a process for the sweetening of mercaptan-containing gasoline having from about 2 to about 20 p.p.m. alkyl phenol which comprises
mixing with the gasoline an aqueous caustic solution comprising from about 10% to about 20% w. sodium hydroxide, the caustic being present in the amount of from 0.05% to about 0.3% v. basis gasoline,
passing the gasoline, now containing caustic,
in the presence of an oxygen-containing gas
through a bed of activated carbon, which has been presoaked with an aqueous caustic solution comprising from about 10% to about 20% w. sodium hydroxide,
at a superficial linear velocity of from about 3 to about 6 feet per minute,
until the bed becomes deactivated,
the improvement which comprises thereafter regenerating the bed
at elevated temperatures
by passing water through the bed.

6. In a process for the sweetening of mercaptan-containing gasoline having from about 2 to about 20 p.p.m. alkyl phenol which comprises
mixing with the gasoline an aqueous caustic solution comprising from about 10% to about 20% w. sodium hydroxide, the caustic being present in the amount of from 0.05% to about 0.3% v. basis gasoline,
passing the gasoline, now containing caustic,
in the presence of an oxygen-containing gas
through a bed of activated carbon, which has been presoaked with an aqueous caustic solution comprising from about 10% to about 20% w. sodium hydroxide,
at a superficial linear velocity of from about 3 to about 6 feet per minute,
until the bed becomes deactivated,
the improvement which comprises thereafter regenerating the bed
at elevated temperatures
by passing wet steam, containing from about 5 to about 10% v. free water, through the bed.

7. In a process for the sweetening of mercaptan-containing gasoline having from about 2 to about 20 p.p.m. alkyl phenol which comprises
mixing with the gasoline an aqueous caustic solution comprising from about 10% to about 20% w. sodium hydroxide, the caustic being present in the amount of from 0.05% to about 0.3% v. basis gasoline, passing the gasoline, now containing caustic, in the presence of an oxygen-containing gas through a bed of activated carbon, which has been presoaked with an aqueous caustic solution comprising from about 10% to about 20% w. sodium hydroxide, at a superficial linear velocity of from about 3 to about 6 feet per minute, until the bed becomes deactivated, the improvement which comprises thereafter regenerating the bed at elevated temperatures of more than 200° F. by passing wet steam through the bed and intermittently flushing the bed with water until the water is substantially free of phenols.

References Cited in the file of this patent

UNITED STATES PATENTS 2,872,412    McNeil et al. _____ Feb. 3, 1959